(12) United States Patent
Hiramatsu

(10) Patent No.: US 11,119,886 B2
(45) Date of Patent: Sep. 14, 2021

(54) SOFTWARE ANALYSIS APPARATUS, SOFTWARE ANALYSIS METHOD, AND COMPUTER READABLE MEDIUM

(71) Applicant: MITSUBISHI ELECTRIC CORPORATION, Tokyo (JP)

(72) Inventor: Michiyasu Hiramatsu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/076,360

(22) PCT Filed: Feb. 14, 2017

(86) PCT No.: PCT/JP2017/005257
§ 371 (c)(1),
(2) Date: Aug. 8, 2018

(87) PCT Pub. No.: WO2017/141893
PCT Pub. Date: Aug. 24, 2017

(65) Prior Publication Data
US 2019/0042393 A1 Feb. 7, 2019

(30) Foreign Application Priority Data
Feb. 17, 2016 (JP) .............................. JP2016-028160

(51) Int. Cl.
*G06F 11/36* (2006.01)
*G06F 8/41* (2018.01)
(Continued)

(52) U.S. Cl.
CPC ............ *G06F 11/3604* (2013.01); *G06F 8/20* (2013.01); *G06F 8/433* (2013.01); *G06F 8/75* (2013.01); *G06F 9/44* (2013.01)

(58) Field of Classification Search
CPC ........ G06F 11/3604; G06F 8/20; G06F 8/433; G06F 8/75; G06F 9/44
See application file for complete search history.

(56) References Cited

U.S. PATENT DOCUMENTS 9,323,644 B1 * 4/2016 Hale .................... G06F 16/2237
9,454,465 B1 * 9/2016 Jhoney ................ G06F 11/3692
(Continued)

FOREIGN PATENT DOCUMENTS

| JP | H09-160765 A | 6/1997 |
| JP | H10-097417 A | 4/1998 |
| JP | 2013-156786 A | 8/2013 |

OTHER PUBLICATIONS

Dale Shires et al., "Program Flow Graph Construction for Static Analysis of Explicitly Parallel Message-Passing Programs," 2000 [retrieved on Apr. 26, 2020], Army Research Laboratory, downloaded from from the Internet at <url>:https://apps.dtic.mil/dtic/tr/fulltext/u2/a386599.pdf. (Year: 2000).*

(Continued)

*Primary Examiner* — S. Sough
*Assistant Examiner* — Stephen D Berman
(74) *Attorney, Agent, or Firm* — Buchanan Ingersoll & Rooney PC

(57) ABSTRACT

An analyzing unit analyzes source code specified by an input unit, to obtain fixed values which are used to distinguish between pieces of content of communication data for realizing a dependency relationship between pieces of software. A relationship between the obtained fixed values and software elements is saved in a storage unit. By an influence-by-change analyzing unit, pieces of information on a plurality of pieces of software saved in the storage unit are associated with each other based on the fixed values used to distinguish between pieces of content of communication data, and a dependency relationship between software pro- (Continued)

gram elements is analyzed. Analysis results are displayed in a diagram or table format on a display unit.

17 Claims, 11 Drawing Sheets

(51) Int. Cl.
*G06F 8/75* (2018.01)
*G06F 8/20* (2018.01)
*G06F 9/44* (2018.01)

(56) References Cited

U.S. PATENT DOCUMENTS

| | | | |
|---|---|---|---|
| 2002/0129340 A1* | 9/2002 | Tuttle | G06F 16/9535 717/132 |
| 2006/0143596 A1* | 6/2006 | Miyashita | G06F 8/433 717/131 |
| 2008/0163187 A1* | 7/2008 | Loft | G06F 8/71 717/168 |
| 2014/0013304 A1 | 1/2014 | Vangala et al. | |
| 2014/0035922 A1* | 2/2014 | Watt | G06F 11/323 345/440 |
| 2014/0331203 A1 | 11/2014 | Elshishiny et al. | |
| 2015/0089478 A1* | 3/2015 | Cheluvaraju | G06F 8/71 717/123 |
| 2016/0292066 A1* | 10/2016 | Stevens | G06F 11/3624 |

OTHER PUBLICATIONS

Richard Graham et al., "Open MPI: A High-Performance, Heterogeneous MPI," 2006 [retrieved on Nov. 7, 2020], 2006 IEEE International Conference on Cluster Computing, pp. 1-9, downloaded from <url>:https://ieeexplore.ieee.org/. (Year: 2006).*
International Search Report (PCT/ISA/210) dated May 16, 2017, by the Japanese Patent Office as the International Searching Authority for International Application No. PCT/JP2017/005257.
Written Opinion (PCT/ISA/237) dated May 16, 2017, by the Japanese Patent Office as the International Searching Authority for International Application No. PCT/JP2017/005257.
Lehnert, "A Review of Software Change Impact Analysis", (Jan. 1, 2011), Retrieved from the Internet: URL:https://pdfs.semanticscholar.org/87bd/ a053d6e5b0cb06a508b21 db39a1 fe37503da.pdf. XP055546804. (39 pages).
Extended European Search Report dated Feb. 13, 2019, issued by the European Patent Office in corresponding European Application No. 17753150.6. (10 pages).
Office Action (Communication pursuant to Article 94(3) EPC) dated Mar. 9, 2021, by the European Patent Office in corresponding European Patent Application No. 17753150.6. (6 pages).

* cited by examiner

Fig. 5

```
//INITIAL VALUE SETTING
VAR IDENTIFICATION1 = 1            //ASSIGNMENT OF CONNECTION IDENTIFIER = 1
VAR IDENTIFICATION2 = 2            //ASSIGNMENT OF CONNECTION IDENTIFIER = 2
VAR IDENTIFICATION3 = 3            //ASSIGNMENT OF CONNECTION IDENTIFIER = 3
TXT DEPARTMENT = ""                //INITIALIZATION OF VARIABLE
TXT DATA BODY = ""                 //INITIALIZATION OF VARIABLE
//CONNECTING POINT
CALL "DATA RECEPTION"              //DATA IS RECEIVED
IF CONNECTION ID = IDENTIFICATION1 THEN DEPARTMENT = "ACCOUNTING DEPARTMENT "
                                   //IF CONNECTION IDENTIFIER IS 1, THEN "ACCOUNTING DEPARTMENT" IS ASSIGNED TO DEPARTMENT
IF CONNECTION ID = IDENTIFICATION2 THEN DEPARTMENT = "SALES DEPARTMENT "
                                   //IF CONNECTION IDENTIFIER IS 2, THEN "SALES DEPARTMENT" IS ASSIGNED TO DEPARTMENT
IF CONNECTION ID = IDENTIFICATION3 THEN DEPARTMENT = "MANUFACTURING DEPARTMENT "
                                   //IF CONNECTION IDENTIFIER IS 3, THEN "MANUFACTURING DEPARTMENT" IS ASSIGNED TO DEPARTMENT
//MAIN
IF DEPARTMENT = "ACCOUNTING DEPARTMENT" THEN CALL "ACCOUNTING DEPARTMENT PROCESS "
                                   //IF DEPARTMENT IS "ACCOUNTING DEPARTMENT", THEN "ACCOUNTING DEPARTMENT PROCESS" IS PERFORMED
IF DEPARTMENT = "SALES DEPARTMENT" THEN CALL "SALES DEPARTMENT PROCESS "
                                   //IF DEPARTMENT IS "SALES DEPARTMENT", THEN "SALES DEPARTMENT PROCESS" IS PERFORMED
IF DEPARTMENT = "MANUFACTURING DEPARTMENT" THEN CALL "MANUFACTURING DEPARTMENT PROCESS "
                                   //IF DEPARTMENT IS "MANUFACTURING DEPARTMENT", THEN "MANUFACTURING DEPARTMENT PROCESS" IS PERFORMED
//END
//FUNCTION F4
FUNCTION "ACCOUNTING DEPARTMENT PROCESS"    //FUNCTION 1 PERFORMS "ACCOUNTING DEPARTMENT PROCESS"
D = DATA BODY
RETURN                             //END OF FUNCTION 1
//FUNCTION F5
FUNCTION "SALES DEPARTMENT PROCESS"    //FUNCTION 2 PERFORMS "SALES DEPARTMENT PROCESS"
E = DATA BODY
RETURN                             //END OF FUNCTION 2
//FUNCTION F6
FUNCTION "MANUFACTURING DEPARTMENT PROCESS" //FUNCTION 3 PERFORMS "MANUFACTURING DEPARTMENT PROCESS"
F = DATA BODY
RETURN                             //END OF FUNCTION 3
```

SW ELEMENT, SW ELEMENT, SW ELEMENT, SW ELEMENT, SW ELEMENT, SW ELEMENT

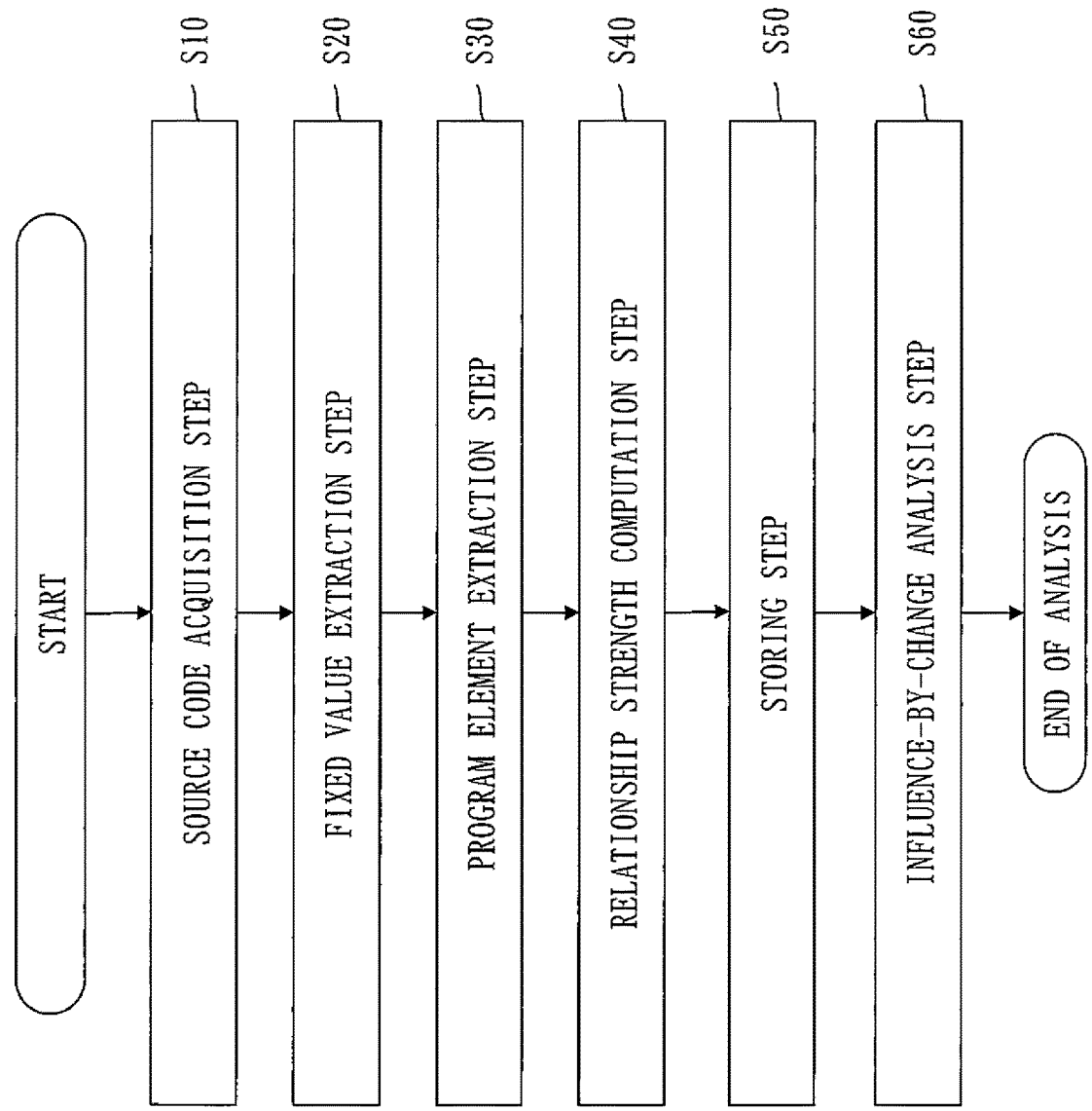

Fig. 8

| CONNECTION IDENTIFIER | SOFTWARE 1 SW1 | | | SOFTWARE 2 SW2 | | | SOFTWARE 3 SW3 | | SOFTWARE 4 SW4 |
|---|---|---|---|---|---|---|---|---|---|
| | F1 | F2 | F3 | F4 | F5 | F6 | FUNCTION 1 | FUNCTION 2 | — |
| 1 | STRONG | × | × | STRONG | × | × | STRONG | × | WEAK |
| 2 | × | STRONG | × | × | STRONG | × | × | INTER MEDIATE | INTER MEDIATE |
| 3 | × | × | STRONG | × | × | STRONG | STRONG | STRONG | WEAK |

| | | SW 1 | | | SW 2 | | | SW 3 | | SW 4 |
|---|---|---|---|---|---|---|---|---|---|---|
| | | F1 | F2 | F3 | F4 | F5 | F6 | FUNCTION 1 | FUNCTION 2 | — |
| SW 1 | F1 | — | × | × | STRONG | × | × | STRONG | × | — |
| | F2 | × | — | × | × | STRONG | × | × | INTERMEDIATE | WEAK |
| | F3 | × | × | — | × | × | STRONG | STRONG | INTERMEDIATE | INTERMEDIATE |
| SW 2 | F4 | STRONG | × | × | — | × | × | × | STRONG | WEAK |
| | F5 | × | STRONG | × | × | — | × | × | × | × |
| | F6 | × | × | STRONG | × | × | — | × | × | × |
| SW 3 | FUNCTION 1 | STRONG | × | STRONG | × | × | × | — | × | STRONG |
| | FUNCTION 2 | × | INTERMEDIATE | STRONG | × | × | × | × | — | × |
| SW 4 | — | WEAK | INTERMEDIATE | WEAK | × | × | × | STRONG | × | — |

31

SOFTWARE ANALYSIS APPARATUS, SOFTWARE ANALYSIS METHOD, AND COMPUTER READABLE MEDIUM

TECHNICAL FIELD

The present invention relates to a software analysis apparatus and a software analysis method, and more particularly to an apparatus that analyzes the structure of software and visualizes a dependency relationship between pieces of software.

BACKGROUND ART

Due to software becoming multifunctional, the size or complexity of the software is increasing.

In addition, implementing high value-added functions by a plurality of pieces of software or devices constructing one system in conjunction with each other is also increasing. Thus, it is not uncommon to construct one system by several tens to several hundreds of apparatuses.

To develop software in such circumstances, it is very important to find out which part of the entire system is influenced by a change made to a given apparatus. If a developer makes a change without properly recognizing the range of influence, then there is a possibility that an apparatus or a function that is assumed to be unrelated may cause a malfunction resulting from inconsistency in specifications.

In general, the range of influence caused by a change can be examined from a design document related to the software. However, the design specification is written in natural language and thus is difficult to be processed in a mechanical manner, and examination by humans takes a long time and there is also a high likelihood of occurrence of mistakes.

Even in a case of a design specification including a machine-processable model such as unified modeling language (UML), content of the design document may be missing or may be out of date. Hence, due to inconsistency between software that is actually running and the content of the design specification, there is a possibility that correct results may not be able to be obtained.

Another approach is considered in which source code of software is analyzed to identify the range of influence.

In Patent Literature 1, a computer analyzes source code of software to provide information for identifying the range of influence such as a dependency relationship between execution paths or variables of the software, to a user by a flowchart or a tree structure.

CITATION LIST

Patent Literature

Patent Literature 1: JP 2013-156786 A
Patent Literature 2: JP H09-160765 A
Patent Literature 3: JP H10-097417 A

SUMMARY OF INVENTION

Technical Problem

However, in the technique of Patent Literature 1, since a dependency relationship such as assignment or reference of variables described in source code is used, there is a problem that the range of influence including software running on other devices connected by communication cannot be indicated.

An object of the present invention is to analyze the range of influence across software running between a plurality of devices that compose a system.

Solution to Problem

A software analysis apparatus according to the present invention is the software analysis apparatus for software that processes data.

The software analysis apparatus including:

an analyzing unit to analyze source code of software that processes data, extract a fixed value used to identify data and a software element forming the software, and associate the fixed value with the software element;

a storage unit to save, as analysis result information, association information between the fixed value and the software element associated by the analyzing unit;

an influence-by-change analyzing unit to find a dependency relationship between pieces of software based on the analysis result information saved in the storage unit; and a display unit to display the dependency relationship found by the influence-by-change analyzing unit.

Advantageous Effects of Invention

In the present invention, based on fixed values obtained by analyzing software, a plurality of pieces of software are associated with each other, by which a dependency relationship between the pieces of software is provided to a user, enabling to trace influences caused by a change upon software change.

BRIEF DESCRIPTION OF DRAWINGS

FIG. 5 is an example of source code of software 2.

FIG. 6 is a diagram of a software analysis method.

FIG. 8 is an example of a table 31 that saves program element relationships on a per connection identifier basis.

FIG. 11 is an example in which software elements are arranged on both the vertical and horizontal axes and the presence or absence and strength of a dependency relationship are displayed.

DESCRIPTION OF EMBODIMENTS

First Embodiment

An embodiment of a software analysis apparatus according to the present invention will be described in detail below based on the drawings. Note that the invention is not to be restricted by the embodiment.

The present embodiment describes an influence-by-change tracing apparatus that traces influences exerted by a change to software on other software.

Description of Configuration

Figure 1:
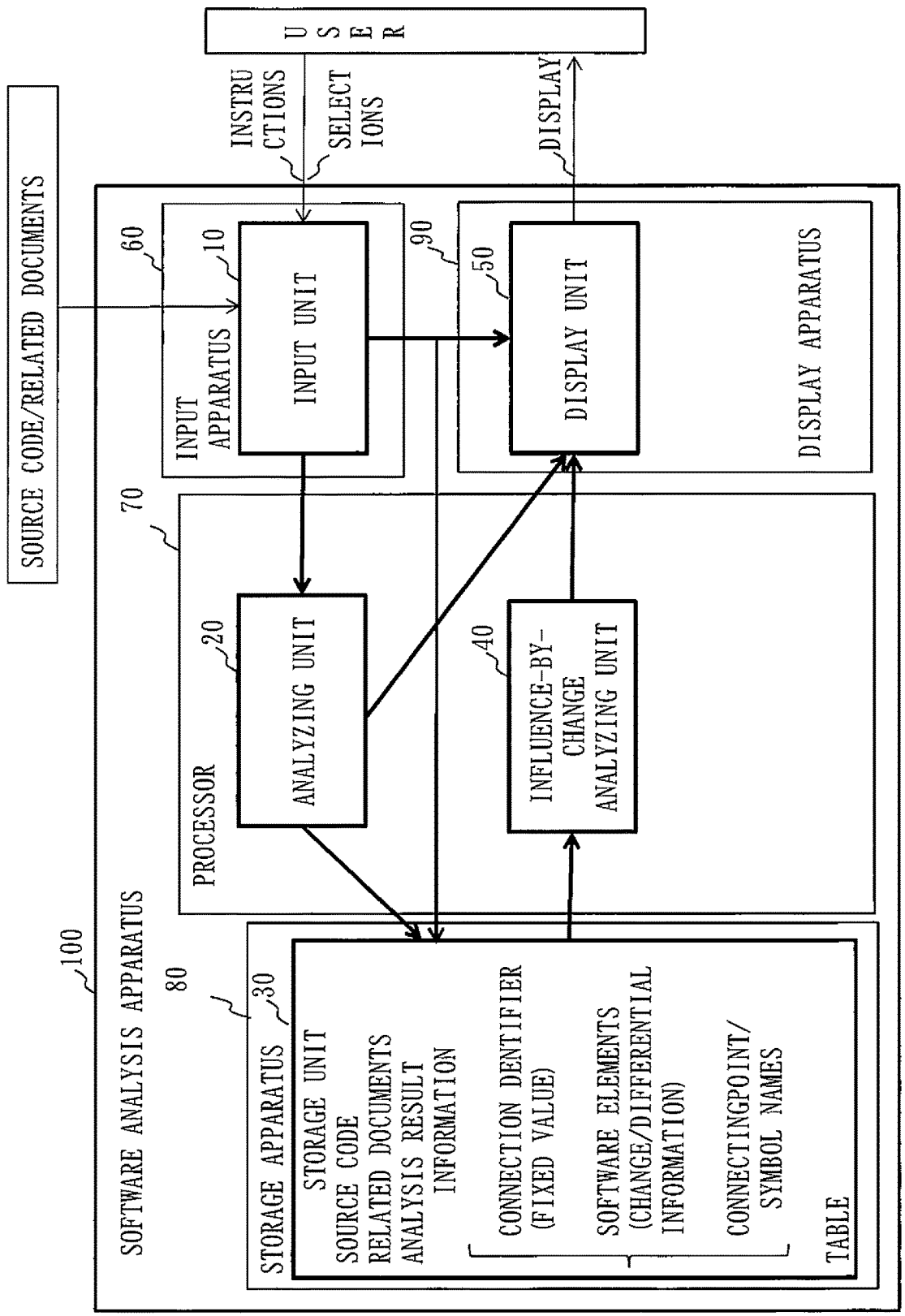
FIG. 1 is a basic configuration diagram of a software analysis apparatus 100.

FIG. 1 is a basic configuration diagram of a software analysis apparatus 100 of the present embodiment.

An input unit 10 accepts, as input, source code of analysis-target software and related documents. The analysis-target software is software that processes communication data. In addition, the input unit 10 accepts, as input, user's instructions and user's selections.

An analyzing unit 20 analyzes the source code inputted from the input unit 10.

The analyzing unit 20 analyzes the source code of the software that processes communication data, extracts fixed values used to identify communication data, and software elements that compose the software, and associates the fixed values with the software elements.

A storage unit 30 saves, as analysis result information, association information between the fixed values and the software elements which are associated by the analyzing unit 20. The storage unit 30 further saves, associating with the software, the source code, supplementary information such as a design specification and a test specification, the related documents, and the like, which are obtained from the input unit 10.

An influence-by-change analyzing unit 40 finds a dependency relationship between pieces of software based on the analysis result information saved in the storage unit 30. The influence-by-change analyzing unit 40 creates information on the range of influence caused by a change between pieces of software, from software analysis results accumulated in the storage unit 30.

A display unit 50 displays the dependency relationship found by the influence-by-change analyzing unit. The display unit 50 displays the information on the range of influence caused by a change which is created by the influence-by-change analyzing unit 40, to a user.

A hardware configuration of the software analysis apparatus 100 according to the present embodiment will be described based on FIG. 1.

The software analysis apparatus 100 is composed of an input apparatus 60, a processor 70, a storage apparatus 80, and a display apparatus 90.

The input apparatus 60 is specifically a keyboard, a mouse, or input devices. The input devices are specifically a reader or a scanner. The input apparatus 60 may be an input interface such as a communication interface or a memory stick interface.

The processor 70 is an IC that performs processing, and implements processes to be performed by the analyzing unit 20 and the influence-by-change analyzing unit 40 by executing a program. The IC is an abbreviation of Integrated Circuit. The processor 70 is specifically a CPU, a DSP, and a GPU. The CPU is an abbreviation of Central Processing Unit. The DSP is an abbreviation of Digital Signal Processor. The GPU is an abbreviation of Graphics Processing Unit. The processor 70 may be a processing circuitry.

The storage apparatus 80 is specifically a RAM and an HDD. The RAM is an abbreviation of Random Access Memory. The HDD is an abbreviation of Hard Disk Drive. The storage apparatus 80 may be composed of other hardware such as a ROM and a flash memory. The ROM is an abbreviation of Read Only Memory.

The display apparatus 90 is specifically a display device, a liquid crystal display apparatus, or a projector apparatus.

Information, data, signal values, and variable values that indicate the results of a process of each function implemented by the processor 70 are stored in the storage apparatus 80 or a register or a cache memory in the processor 70. The following description is made assuming that information, data, signal values, and variable values that indicate the results of a process of each function implemented by the processor 70 are stored in the storage apparatus 80.

A program that implements each function implemented by the processor 70 is stored in the storage apparatus 80. However, the program may be stored in a portable storage medium such as a magnetic disk, a flexible disk, an optical disc, or a compact disc.

Hardware of the software analysis apparatus 100 is specifically one that can be implemented by a personal computer.

Figure 2:
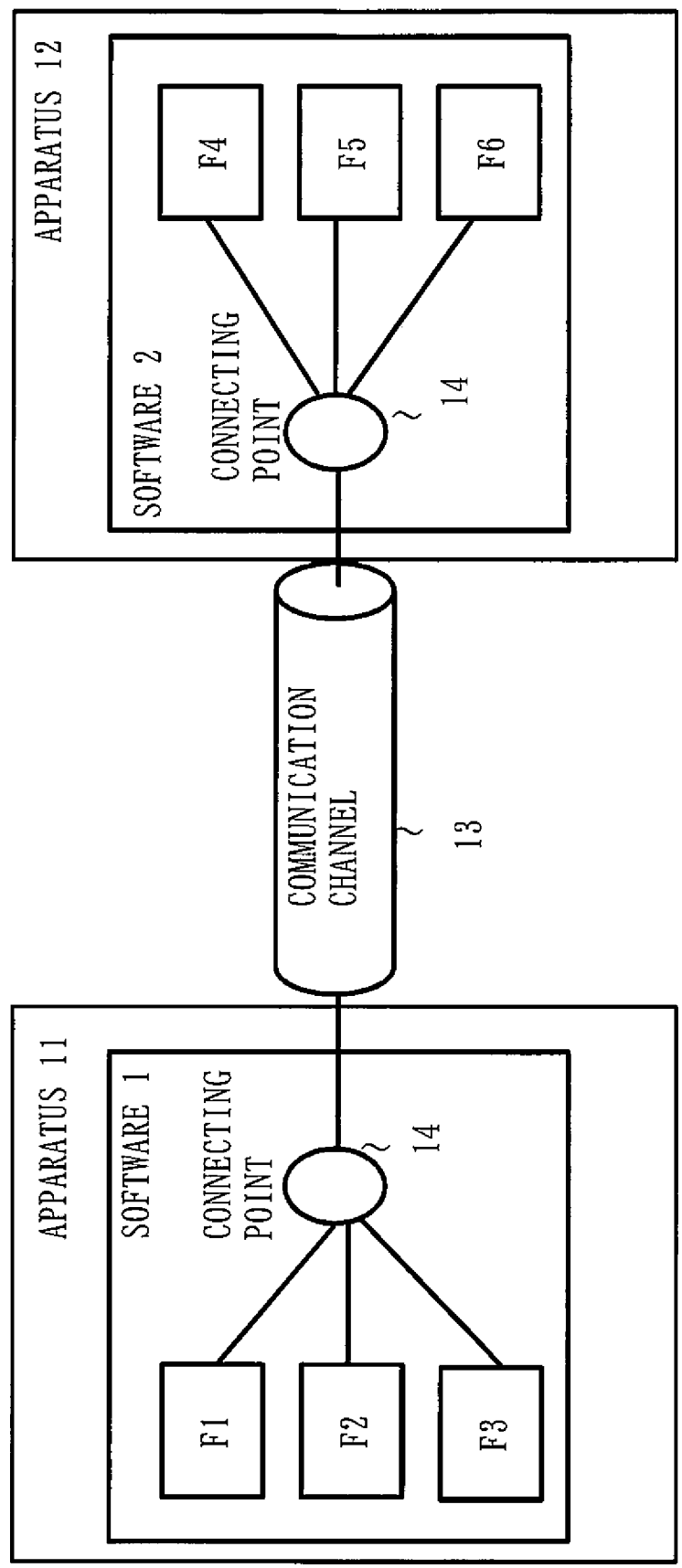
FIG. 2 is a schematic diagram of a system composed of a plurality of apparatuses and a plurality of pieces of software.

FIG. 2 schematically illustrates a plurality of software systems composed of a plurality of apparatuses. Although a 1:1 system composed of two apparatuses is described for simplicity, the present embodiment can be applied regardless of the number of apparatuses to be connected.

An apparatus 11 is connected to an apparatus 12 by a communication channel 13. The apparatus 11 and the apparatus 12 have software 1 and software 2, respectively. The software 1 has functions F1 to F3. The software 2 has functions F4 to F6.

The software 1 and the software 2 each include therein a connecting point 14 as a part for controlling the communication channel 13. The functions F1 to F6 of the pieces of software perform communication through their software's connecting points 14. Here, the connecting point 14 is a routine that is incorporated in the software and that is to connect related functions. Specifically, when a process related to the function F1 and the function F4 is performed, the connecting point 14 is a portion that connects the function F1 to the function F4.

Since the functions F1 to F6 thus share the single communication channel 13, in order to properly perform communication by each function, data that passes through the communication channel needs to be distinguishable on a function-by-function basis. Specifically, since data of the function F1 needs to be processed by the function F4, the data of the function F1 passing through the communication channel needs to be distinguished from data of the function 2 and data of the function 3.

For an easy understanding of explanation, the following specific example is used:

The apparatus 11 and the apparatus 12 of FIG. 2 are apparatuses that perform processes for departments of company A.

It is assumed that the function F1 and the function F4 perform a process for an "accounting department" which is a department of the company.

It is assumed that the function F2 and the function F5 perform a process for a "sales department" which is a department of the company.

It is assumed that the function F3 and the function F6 perform a process for a "manufacturing department" which is a department of the company.

Figure 3:
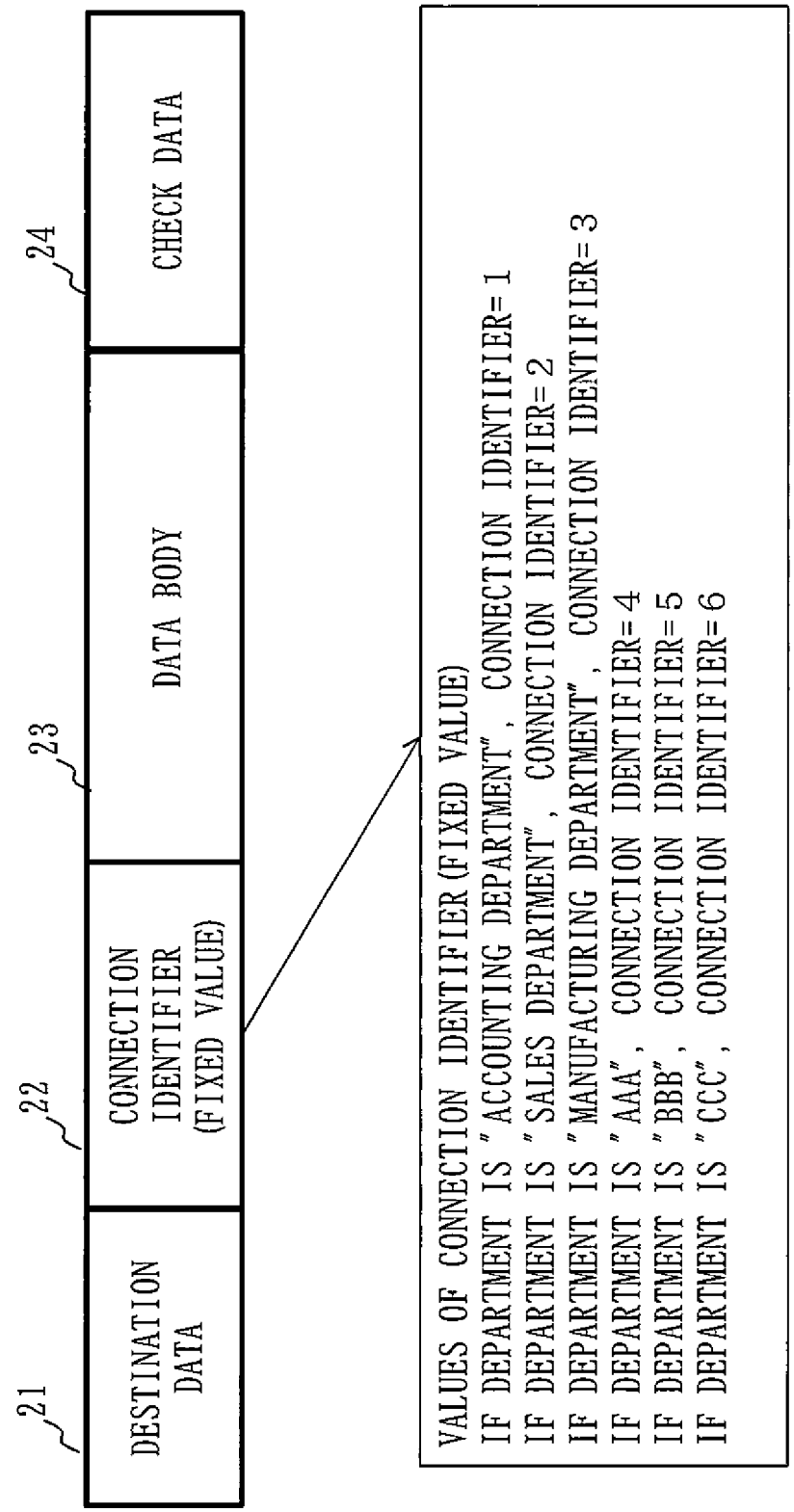
FIG. 3 is an example of data exchanged over a communication channel.

FIG. 3 illustrates an example of a format defined as a communication protocol and illustrates an example of data exchanged through the communication channel.

Destination data 21 is a value used to determine a destination apparatus, and is specifically a destination address.

A connection identifier 22 is a value given so as to be allocated to an appropriate function by an apparatus that receives data body 23 subsequent thereto, and is a fixed value (constant) that is defined for each function (the content of data) by the protocol. The connection identifier 22 is a specific example of a fixed value that is given or referred to in order to identify communication content upon performing communication with other software.

Specific values of the connection identifier 22 are as follows:

If the department is the "accounting department", then the connection identifier=1.

If the department is the "sales department", then the connection identifier=2.

If the department is the "manufacturing department", then the connection identifier=3.

If the department is "AAA", then the connection identifier=4.

If the department is "BBB", then the connection identifier=5.

If the department is "CCC", then the connection identifier=6.

The values of the connection identifier 22 are fixed values common to the entire system of company A, and are defined in advance by the communication protocol.

The data body 23 is the content of data to be actually transmitted or received, and has the value of the data stored therein.

Check data 24 is the value of, for example, a cyclic redundancy code (CRC) given to ensure the quality of communication.

Each of the functions F1 to F6 of FIG. 2 includes the function of generating/interpreting the value of the data body 23 of FIG. 3.

The connecting points 14 of FIG. 2 have the function of setting the value of the connection identifier 22 of FIG. 3, or the function of determining a corresponding one of the functions F1 to F6 by the value of the connection identifier 22.

Figure 4:
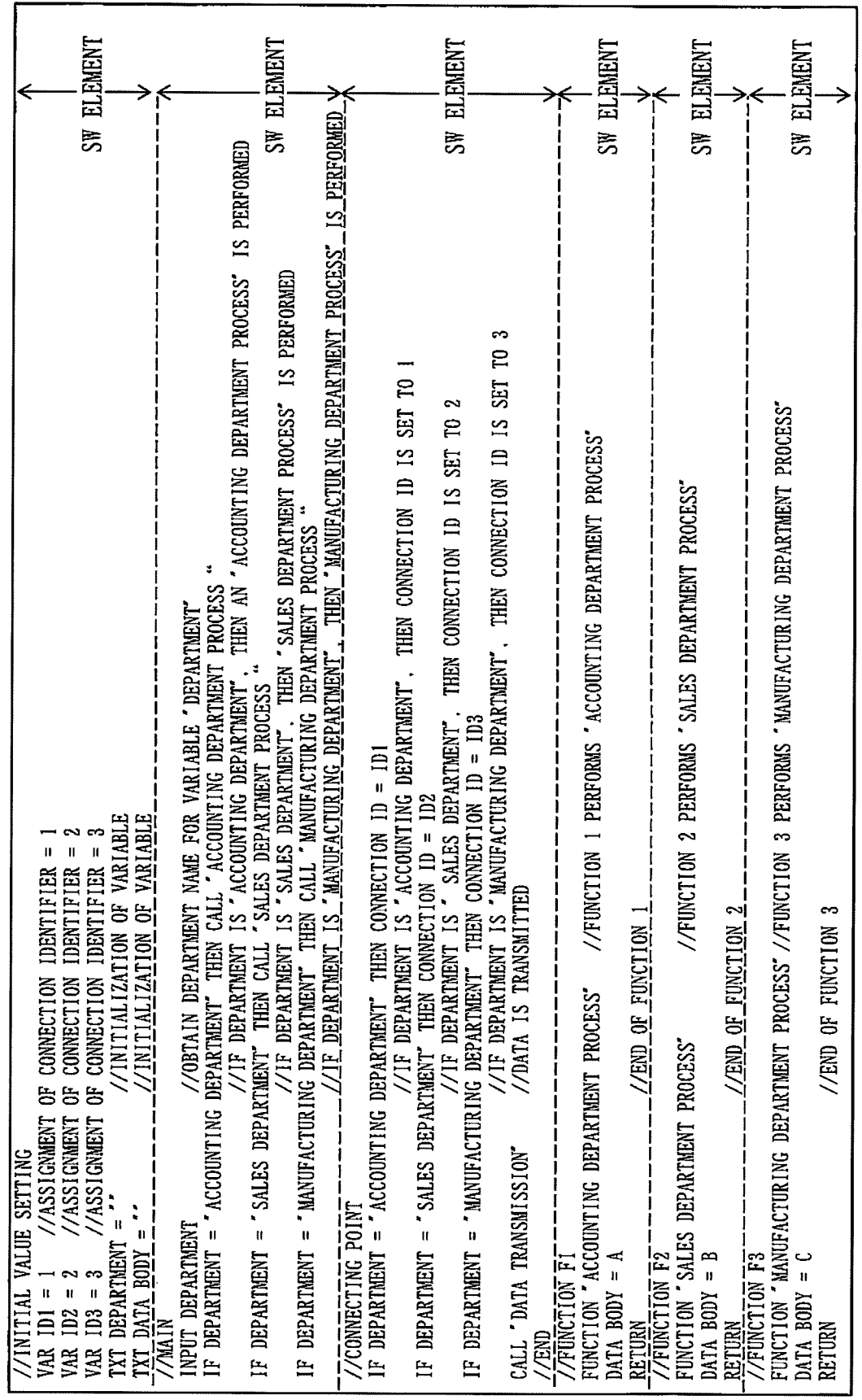
FIG. 4 is an example of source code of software 1.

FIG. 4 is an example of source code of the software 1. FIG. 5 is an example of source code of the software 2. FIGS. 4 and 5 both indicate source code in a virtual programming language. In FIGS. 4 and 5, "II" indicates the start of a comment, and description after "II" of each line is comment information. The meaning of each line can be understood by reading comment information and thus here explanation is made briefly.

The software 1 is a program that creates and transmits data for the accounting department, sales department, and manufacturing department of company A.

The software 2 is a program that receives and processes the data for the accounting department, sales department, and manufacturing department of company A.

Normally, software has one unit or more of software element. The software element is a single meaningful routine. Specific examples of the software element include each function of the functions F1 to F6, each function, and each function module. Alternatively, the software element may be a function, a class, a subroutine, or an external routine. When one piece of software includes only one software element, software=a software element.

The software 1 of FIG. 4 has the following six software elements:
1. INITIAL VALUE SETTING
2. MAIN
3. CONNECTING POINT
4. FUNCTION F1
5. FUNCTION F2
6. FUNCTION F3

The software 2 of FIG. 5 has the following six software elements:
1. INITIAL VALUE SETTING
2. CONNECTING POINT
3. MAIN
4. FUNCTION F4
5. FUNCTION F5
6. FUNCTION F6

Description of Operation

A software analysis method for the software analysis apparatus 100 will be described below using FIGS. 6 and 7.

The analyzing unit 20 analyzes source code and stores, in the storage unit 30, the source code, a source code version, a connecting point used upon the analysis, and variables/constants serving as the connection identifier, together with analysis result information.

Step S10: Source Code Acquisition Step by a Source Code Acquisition Processing Unit 210

The source code acquisition processing unit 210 in the analyzing unit 20 acquires source code from the input unit 10.

Step S20: Fixed Value Extraction Step by a Fixed Value Extraction Processing Unit 220

The fixed value extraction processing unit 220 in the analyzing unit 20 analyzes the source code acquired from the input unit 10, to extract a connection identifier as a fixed value from the source code and further extract a software element related to the connection identifier.

Figure 7:
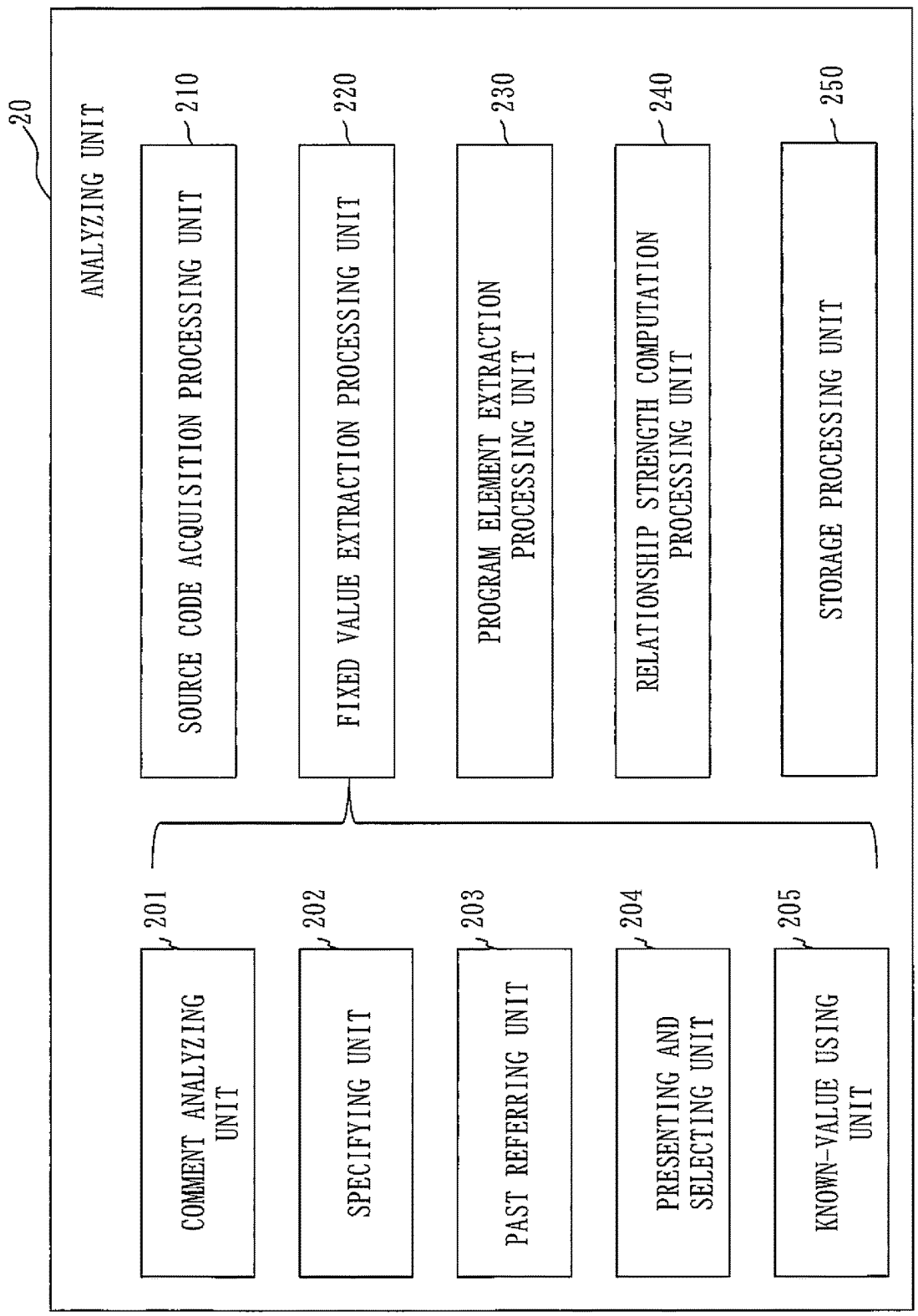
FIG. 7 is a configuration diagram of an analyzing unit 20.

As illustrated in FIG. 7, the fixed value extraction processing unit 220 extracts a connection identifier as a fixed value by combining the following methods 1 to 5. An extraction result can also be added/deleted by a user.

Method 1: A comment analyzing unit 201 refers to comment information in the source code.

The comment analyzing unit 201 extracts a connection identifier given to identify communication content, using comment information such as a comment described in the analysis-target source code.

To perform this method, there is a need to specify a connecting point by comment information (comment) in a predetermined format or specify variables or constants serving as the connection identifier, in source code to be analyzed.

When the analyzing unit 20 has found such a comment, the analyzing unit 20 uses a connecting point or a connection identifier indicated by the comment.

<<Case of Specifying a Connecting Point by Comment Information (Comment)>>

It is assumed that the comment information (comment) in a predetermined format is the comment "//CONNECTING POINT".

In the case of the software 1 illustrated in FIG. 4, the comment analyzing unit 201 searches for the comment information in a determined format "//CONNECTING POINT", and thereby obtains the following description of the connecting point, and analyzes the description to analyze which symbol names are used for the connection identifier by the software 1:

"IF DEPARTMENT="ACCOUNTING DEPARTMENT" THEN CONNECTION ID=ID1

IF DEPARTMENT="SALES DEPARTMENT" THEN CONNECTION ID=ID2

IF DEPARTMENT="MANUFACTURING DEPARTMENT" THEN CONNECTION ID=ID3"

The comment analyzing unit 201 finds that the software 1 uses the following three symbol names for the connection identifier:

1. ID1
2. ID2
3. ID3

Then, the comment analyzing unit 201 searches for assignment statements for the symbol names ID1, ID2, and ID3 serving as the connection identifier, and thereby detects the following three lines and detects that the constants 1, 2, and 3 are used as the values of the connection identifier:

"VAR ID1 = 1   //ASSIGNMENT OF CONNECTION IDENTIFIER = 1
VAR ID2 = 2   //ASSIGNMENT OF CONNECTION IDENTIFIER = 2
VAR ID3 = 3   //ASSIGNMENT OF CONNECTION IDENTIFIER = 3"

<<Case of Specifying in Advance the Symbol Names of the Connection Identifier>>

It is assumed that predetermined symbol names are "ID1, ID2, and ID3".

In the case of the software 1 illustrated in FIG. 4, the comment analyzing unit 201 searches for assignment statements of the connection identifier to the symbol names ID1, ID2, and ID3, and thereby detects the following three lines and detects that the constants 1, 2, and 3 are used as the values of the connection identifier:

"VAR ID1 = 1   //ASSIGNMENT OF CONNECTION IDENTIFIER = 1
VAR ID2 = 2   //ASSIGNMENT OF CONNECTION IDENTIFIER = 2
VAR ID3 = 3   //ASSIGNMENT OF CONNECTION IDENTIFIER = 3"

<<Case of Specifying in Advance Constants Serving as the Connection Identifier>>

It is assumed that predetermined constants are "1, 2, and 3".

In the case of the software 1 illustrated in FIG. 4, the comment analyzing unit 201 searches for assignment statements for the constants 1, 2, and 3 serving as the connection identifier, and thereby detects the following three lines and detects that the variables for the values of the connection identifier 1, 2, and 3 are "ID1, ID2, and ID3":

"VAR ID1 = 1   //ASSIGNMENT OF CONNECTION IDENTIFIER = 1
VAR ID2 = 2   //ASSIGNMENT OF CONNECTION IDENTIFIER = 2
VAR ID3 = 3   //ASSIGNMENT OF CONNECTION IDENTIFIER = 3"

In addition, it is found as a result of the above analysis that the software 1 uses the connection identifier=1, 2, and 3 and the symbol names of the connection identifier are "ID1, ID2, and ID3". In other words, it is found that the software 1 is software related to the connection identifier=1, 2, and 3 and not related to connection identifiers other than the connection identifier=1, 2, and 3 such as the connection identifier=4, 5, and 6.

Method 2: A specifying unit 202 discloses source code on the display unit 50 to allow the user to select a connecting point or a connection identifier.

The specifying unit 202 extracts a connection identifier given to identify communication content, using description in source code that is specified by the user upon analysis.

When the user knows a connecting point or a connection identifier for the software, the user specifies a location of source code to be used for analysis and specifies a connecting point or a connection identifier.

For a process performed after the user selects a connecting point or a connection identifier, a process similar to that performed by the aforementioned comment analyzing unit 201 is performed, by which it can be determined which connection identifier is used by the software.

Method 3: A past referring unit 203 refers to information on a connecting point of similar software having been analyzed in the past.

The past referring unit 203 extracts a connection identifier given to identify communication content, by referring to analysis results of software having a similar structure and having been analyzed in the past.

When there is software having a similar structure and having been used for analysis in the past, the past referring unit 203 extracts, from source code used for the current analysis, a connecting point used upon the past analysis or a variable or a constant having the same name as a variant/constant serving as a connection identifier used upon the past analysis, and uses it as a connecting point or a connection identifier. Typical example of software having a similar structure is an earlier version of the same software.

Method 4: A presenting and selecting unit 204 presents the user with reference statements for variables/constants to allow the user to select a connecting point or a connection identifier.

The presenting and selecting unit 204 presents the user with at least either one or both of reference statements and assignment statements indicating reference relationships or assignment relationships for variables or constants, which are created by analyzing source code.

The presenting and selecting unit 204 allows the user to select a reference statement or an assignment statement from among the presented reference statements or assignment statements, and thereby extracts a connection identifier given to identify communication content.

When the user does not understand the structure of software to be analyzed, the presenting and selecting unit 204 illustrates, on the display unit 50, reference/assignment relationships for variables or constants from the content of source code, to allow the user to select a connecting point or a connection identifier from among them. At this time, the presenting and selecting unit 204 makes it easier for the user to select a connecting point or a connection identifier by, for example, moving a displayed position back and forth or changing the size or color of displayed characters, according to priorities calculated from "one that passes through many program elements when a caller is traced", "one whose number of references is small", or the like.

For example, the presenting and selecting unit 204 presents the following assignment statements to the display unit 50 from the source code of FIG. 4, to allow the user to select a connection identifier:

"VAR ID1 = 1   //ASSIGNMENT OF CONNECTION IDENTIFIER = 1
VAR ID2 = 2   //ASSIGNMENT OF CONNECTION IDENTIFIER = 2
VAR ID3 = 3   //ASSIGNMENT OF CONNECTION IDENTIFIER = 3
TXT DEPARTMENT = ""   //INITIALIZATION OF A VARIABLE
TXT DATA BODY = ""   //INITIALIZATION OF A VARIABLE
DATA BODY = A
DATA BODY = B
DATA BODY = C"

Method 5: A known-value using unit 205 guesses from a known connecting point or connection identifier.

The known-value using unit 205 extracts, as the connection identifier, constants that are treated in a similar manner to a known connection identifier, or fixed values that are directly/indirectly assigned to a variable to which a known connection identifier is assigned.

In the connecting point, constants serving as the connection identifier are set as transmission data. In other words, in the connecting point, constants are directly or indirectly assigned to a variable. Hence, the known-value using unit 205 uses, as the connection identifier, other values that are assigned to a variable assigned in a known connecting point, or constants that are treated in a similar manner to an assigned constant (e.g., that are used in a column of the same table).

When it is known that the "connection ID" is the symbol name of the connection identifier, since in the connecting point of the software 1 illustrated in FIG. 4 there are, as shown below, three assignment statements for the "connection ID", the known-value using unit 205 can determine that ID1, ID2, and ID3 are the connection identifier.

"IF DEPARTMENT="ACCOUNTING DEPARTMENT" THEN CONNECTION ID=ID1
IF DEPARTMENT="SALES DEPARTMENT" THEN CONNECTION ID=ID2
IF DEPARTMENT="MANUFACTURING DEPARTMENT" THEN CONNECTION ID=ID3"

Alternatively, when it is known that ID1 is the symbol name of the connection identifier, since the software 1 illustrated in FIG. 4 describes, as shown below, that ID2=2 and ID3=3 in a similar manner to ID1=1, the known-value using unit 205 can determine that ID2 and ID3 are also the symbol names of the connection identifier.

"VAR ID1 = 1   //ASSIGNMENT OF CONNECTION IDENTIFIER = 1
VAR ID2 = 2   //ASSIGNMENT OF CONNECTION IDENTIFIER = 2
VAR ID3 = 3   //ASSIGNMENT OF CONNECTION IDENTIFIER = 3"

Alternatively, in addition, since it is described as shown below that connection ID=ID2 and connection ID=ID3 in a similar manner to connection ID=ID1, the known-value using unit 205 can determine that ID2 and ID3 are also the symbol names of the connection identifier.

"IF DEPARTMENT="ACCOUNTING DEPARTMENT" THEN CONNECTION ID=ID1
IF DEPARTMENT="SALES DEPARTMENT" THEN CONNECTION ID=ID2
IF DEPARTMENT="MANUFACTURING DEPARTMENT" THEN CONNECTION ID=ID3"

The analyzing unit 20 analyzes software by combining the comment analyzing unit 201, the specifying unit 202, the past referring unit 203, the presenting and selecting unit 204, and the known-value using unit 205.

In addition, it is found as a result of the above analysis that the software 1 uses the connection identifier=1, 2, and 3 as fixed values and the symbol names of the connection identifier are "ID1, ID2, and ID3".

In addition, it is found as a result of similar analysis that the software 2 uses the connection identifier=1, 2, and 3 as fixed values and the symbol names of the connection identifier are "identification 1, identification 2, and identification 3".

Step S30: Program Element Extraction Step by a Program Element Extraction Processing Unit 230

The program element extraction processing unit 230 in the analyzing unit 20 extracts software elements based on syntactic analysis and grammatical analysis. As described previously, the software 1 of FIG. 4 has six software elements, and the program element extraction processing unit 230 extracts the six software elements based on syntactic analysis and grammatical analysis.

Furthermore, the program element extraction processing unit 230 traces a reference relationship for constants for the connection identifier obtained in the fixed value extraction process, and collects information on program elements related to the constants for the connection identifier.

In the case of the software 1 illustrated in FIG. 4, the program element extraction processing unit 230 obtains "IF DEPARTMENT="ACCOUNTING DEPARTMENT" THEN CALL "ACCOUNTING DEPARTMENT PROCESS""

from

"VAR ID1=1" and

"IF DEPARTMENT="ACCOUNTING DEPARTMENT" THEN CONNECTION ID=ID1", and determines that

"FUNCTION "ACCOUNTING DEPARTMENT PROCESS""

is a program element for the connection identifier=1.

Likewise, the program element extraction processing unit 230 determines that "FUNCTION "SALES DEPARTMENT PROCESS"" is a program element for the connection identifier=2, and "FUNCTION "MANUFACTURING DEPARTMENT PROCESS"" is a program element for the connection identifier=3.

In addition, the analyzing unit 20 performs analysis on a different version of the same software.

The analyzing unit 20 makes a comparison to see whether a change has been made to the program elements of the different version of the software, to detect change information indicating whether a change has been made to the program elements. If a change has been made to the program elements, the analyzing unit 20 detects a difference between different program elements as differential information.

Step S40: Relationship Strength Computation Step by a Relationship Strength Computation Processing Unit 240

The relationship strength computation processing unit 240 in the analyzing unit 20 computes, for each software element, the strength of a relationship with the connection identifier. The relationship strength computation processing unit 240, for example, determines an element having a direct reference relationship with the connection identifier to be "strong", and determines an element having an indirect dependency relationship such as a dependence on the output of the element, to be "weak" according to the number of intervening elements.

In addition, as a specific example, the strength of a relationship between the connection identifier=1 and a software element A is computed as follows:

When, in the case of the connection identifier=1, the software element A is always executed and the content of data is updated, the dependency relationship is determined to be "strong".

When, in the case of the connection identifier=1, the software element A is always executed and the content of data, though not updated, is referred to, the dependency relationship is determined to be "intermediate".

When, in the case of the connection identifier=1, the software element A only refers to the connection identifier=1, the dependency relationship is determined to be "weak".

When the software element A does not use the connection identifier=1 at all, the dependency relationship is determined to be "none".

Step S50: Storing Step by a Storage Processing Unit 250

The storage processing unit 250 in the analyzing unit 20 delivers, as analysis result information, the connecting point, the connection identifier, and information on program elements having a dependency relationship with the connection identifier, which are obtained by the analysis, to the storage unit 30.

The storage unit 30 saves the delivered analysis result information and saves the analysis result information in a table 31 illustrated in FIG. 8 on a per value of a connection identifier basis. The term "save on a per value basis" means the use of the actual value of a constant instead of a symbol name or a variable name for identifying a constant value in a program that is used as the connection identifier. Specifically, the values 1, 2, and 3 themselves are used instead of the symbol names ID1, ID2, and ID3. The reason therefor is that the values of the connection identifier 1, 2, and 3 are fixed values unified between a plurality of pieces of software that implement the same protocol, but the symbol names of constant values used for implementation are not always unified between the plurality of pieces of software that implement the same protocol.

For example, the software 1 and 2 use the connection identifier=1, 2, and 3, but in the software 1 the symbol names of the connection identifier are "ID1, ID2, and ID3" and in the software 2 the symbol names of the connection identifier are "identification 1, identification 2, and identification 3", and thus, a table cannot be created using the symbol name.

By this, the storage processing unit 250 constructs the table 31 illustrated in FIG. 8 in the storage unit 30.

The values "F1", "F2", . . . , "function 1", and "function 2" which are the titles of the respective columns of the first row of the table 31 in the drawing indicate program elements such as functions or classes included in analysis-target programs.

The values "1", "2", and "3" which are the titles of the respective rows of the first column of the table 31 in the drawing indicate the values of the connection identifier 1, 2, and 3.

In the table 31, a dependency relationship between the program elements and connection identifier of software having been analyzed is saved in an association manner, e.g., "F1" is a function F1 of the software 1, "F2" is a function F2 of the software 1, "function 1" is a function 1 of software 3, and "function 2" is a function 2 of the software 3.

In the table 31, the meaning of each symbol is as follows:

In the table 31, "strong", "intermediate", "weak", "x", etc., indicate the strength of dependence. Numerical values may be used instead of "strong", "intermediate", "weak", and "x".

"Strong"=the dependency relationship between the program element and the connection identifier is "strong"

"Intermediate"=the dependency relationship between the program element and the connection identifier is "intermediate"

"Weak"=the dependency relationship between the program element and the connection identifier is "weak"

"x"=the dependency relationship between the program element and the connection identifier is "none"

For example, taking a look at the connection identifier=2, it indicates that a "function F2" element and a "function F5" element have a strong relation with the connection identifier=2, and a "function F1" element, a "function F3" element, a "function F4" element, and a "function F6" element have no relation with the connection identifier=2.

When the analyzing unit 20 has not analyzed a reference relationship for the connection identifier, the storage processing unit 250 considers software=a software element and can use the entire program as a unit of element.

Alternatively, when the analyzing unit 20 has analyzed a reference relationship for the connection identifier and has detected only one software element, it is considered that software=a software element, and the entire program can be used as a unit of element.

In FIG. 8, the storage processing unit 250 considers software 4=a software element and uses the entire program as a software element.

The storage processing unit 250 in the analyzing unit 20 also saves, in the storage unit 30, information about the connecting point or the symbol names of the connection identifier of analysis-target software. The information about the connecting point or the symbol names of the connection identifier is used to extract a connecting point or a connection identifier by method 3 of the analyzing unit 20.

The storage processing unit 250 in the analyzing unit 20 stores, in the storage unit 30, as information related to the connection identifier, various types of related documents together with the strength of a program element dependency relationship. The various types of related documents are registered as related information by the user upon analysis so as to be displayed as related information upon displaying the dependency relationship.

When the analyzing unit 20 has performed analysis on a different version of the same software, the storage processing unit 250 delivers change information indicating whether a change has been made to program elements and differential information to the storage unit 30, in addition to analysis result information for the connection identifier. The storage unit 30 saves the change information and the differential information associating with a program element, together with the analysis result information.

The analyzing unit 20 creates the table 31 illustrated in FIG. 8 every time software is analyzed, and accumulates analysis result information. When the analyzing unit 20 has analyzed the software 1, 2, 3, and 4 in turn, the analyzing unit 20 can first register only the software 1 portion of the table 31. Then, by the analyzing unit 20 analyzing the software 2, the software 2 portion of the table 31 can be additionally registered. Then, by the analyzing unit 20 analyzing the software 3, the software 3 portion of the table 31 is additionally registered, and furthermore, by the analyzing unit 20 analyzing the software 4, the software 4 portion of the table 31 can be additionally registered.

The above is the processes of the analyzing unit 20.

In analysis by the analyzing unit 20, the analyzing unit 20 merely analyzes each software, accumulates analysis result information, and constructs the table 31. Analysis of a dependency relationship between pieces of software is performed by the influence-by-change analyzing unit 40 which is described below.

Step S60: Influence-by-Change Analysis Step by the Influence-by-Change Analyzing Unit 40

The influence-by-change analyzing unit 40 calculates a dependency relationship between a plurality of pieces of analyzed software saved in the storage unit 30, based on fixed values which are the connection identifier given to identify communication content.

The influence-by-change analyzing unit 40 is to analyze a dependency relationship between a plurality of pieces of software and thus operates when analysis result information for a plurality of pieces of software is stored in the table 31.

The influence-by-change analyzing unit 40 reads and organizes the analysis result information and table 31 saved in the storage unit 30, and determines the presence or absence or strength of a dependency relationship on a per software or software element basis. The influence-by-change analyzing unit 40 determines the presence or absence of a dependency relationship between pieces of software, by whether the same value of the connection identifier is used. The influence-by-change analyzing unit 40 determines the presence or absence of a dependency relationship between software elements on a per value of the connection identifier basis, the value of the connection identifier being described in each row of the table 31 of FIG. 8. Specifically, the influence-by-change analyzing unit 40 searches the first row and thereby finds that software elements related to the connection identifier=1 are the function F1, the function F4, the function 1, and the software 4, and thus, determines that the function F1, the function F4, the function 1, and the software 4 are software elements having a dependency relationship.

In addition, the influence-by-change analyzing unit 40 determines the strength of a dependency relationship from the number of software elements that use the same value of the connection identifier. Specifically, in the table 31 of FIG. 8, since two software elements of the software 3 are related to the connection identifier=3, the influence-by-change analyzing unit 40 determines that the strength of a dependency relationship between the connection identifier=3 and the software 3 is strong.

In addition, the influence-by-change analyzing unit 40 determines the strength of a dependency relationship from the percentage of software elements that use the same value of the connection identifier. Specifically, in the table 31 of FIG. 8, since the two software elements of the software 3 are both related to the connection identifier=3, the influence-by-change analyzing unit 40 determines that the strength of a dependency relationship between the connection identifier=3 and the software 3 is strong.

The influence-by-change analyzing unit 40 displays dependency relationship analysis results on the display unit 50.

The influence-by-change analyzing unit 40 graphically displays the presence or absence or strength of a dependency relationship on the display unit 50, using a diagram or a table. At this time, the user can select a unit of display from "software", "software program elements", "files including software program elements", "folders having files including software program elements", "collection of program elements defined by the user", etc.

Figure 9:
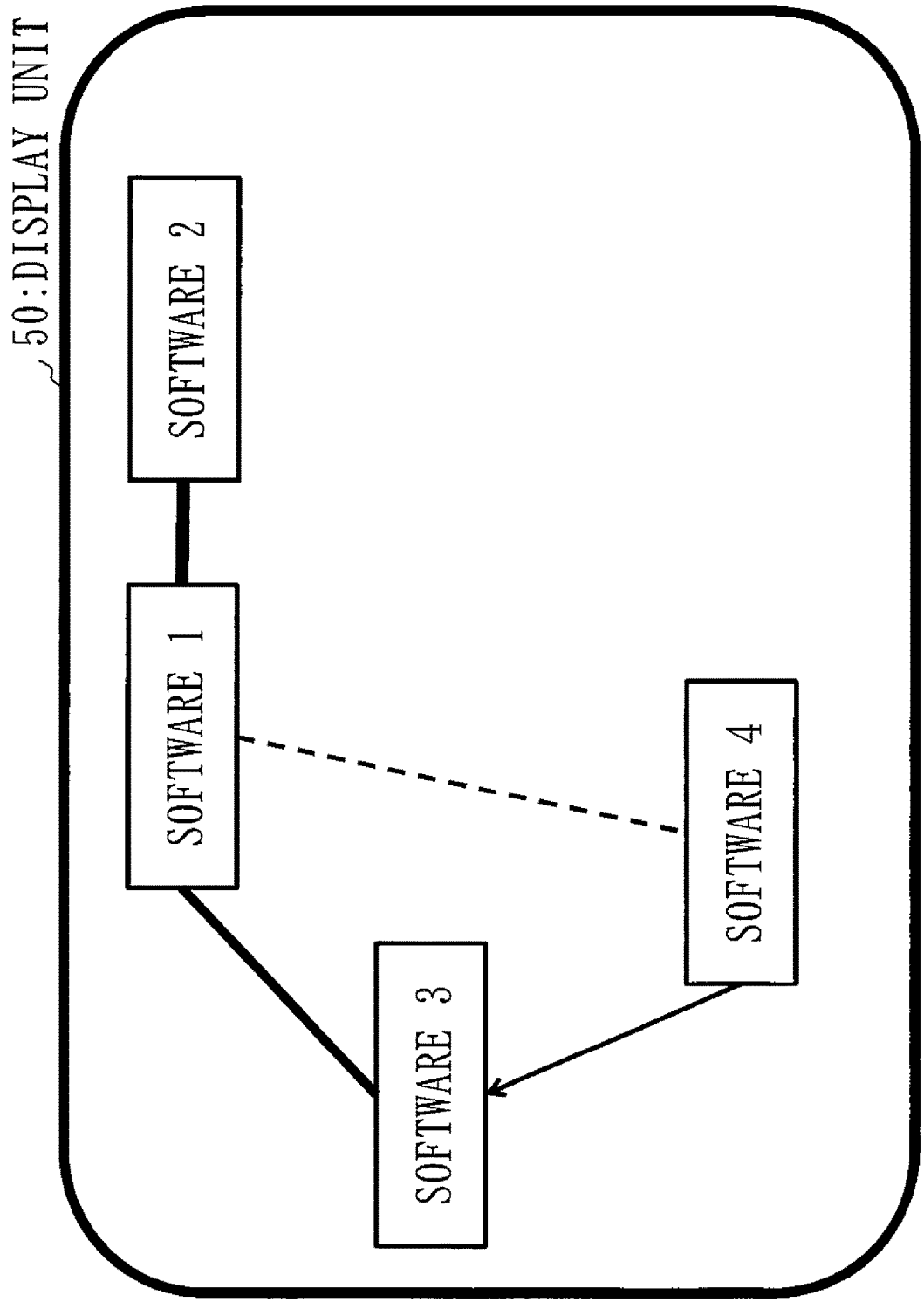
FIG. 9 is an example in which a dependency relationship is displayed on a software-by-software basis.

FIG. 9 is an example case in which the presence or absence of a dependency relationship is displayed on a software-by-software basis.

The influence-by-change analyzing unit 40 uses software or a software element as a node and displays, on the display unit 50, a directed or undirected graph in which the nodes are connected by whether there is a dependency relationship.

The influence-by-change analyzing unit 40 can indicate the strength of dependence by any of at least the length of a line, the thickness of the line, the color of the line, the type of the line, and a remark (comment characters) on the line of a link portion between pieces of software. Alternatively, the influence-by-change analyzing unit 40 can indicate the strength of dependence by a combination of two or more of the length of the line, the thickness of the line, the color of the line, the type of the line, and a remark (comment characters) on the line. In FIG. 9, the strength of a dependency relationship is displayed by the length of the line, the thickness of the line, and the type of the line.

The influence-by-change analyzing unit 40 also displays, associating with this diagram, related documents such as design documents or test specifications which are registered upon analysis.

The influence-by-change analyzing unit 40 may allow a link representing a dependency relationship to have a direction in accordance with the transmission and reception directions. FIG. 9 shows a direction from software 4 to software 3.

Figure 10:
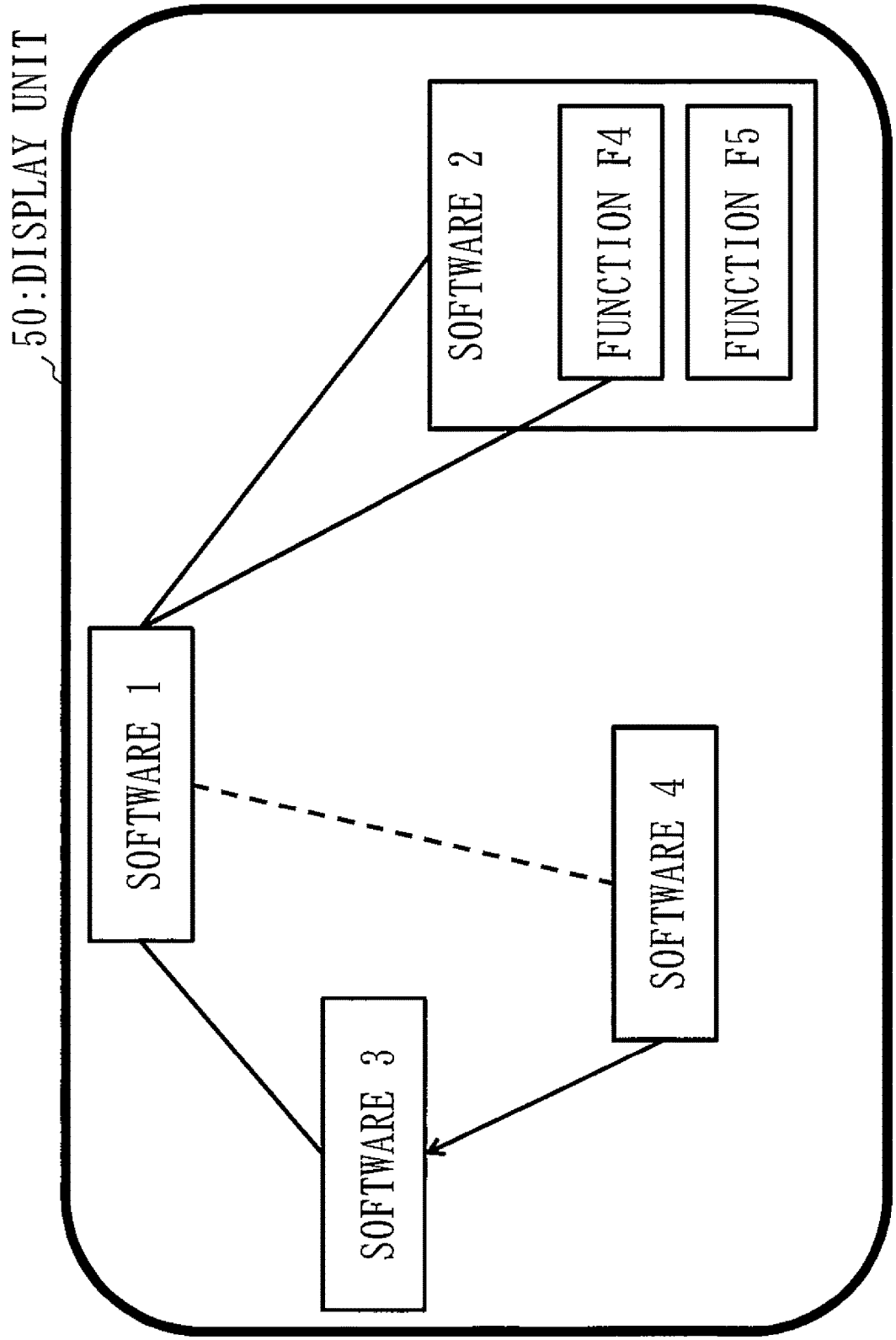
FIG. 10 is an example in which a dependency relationship is illustrated on a software-by-software basis, and a dependency relationship with a program element is partially displayed.

In addition, for a unit of software elements to be displayed, the influence-by-change analyzing unit 40 can perform display in combination of different units such as "association between software 1 and each function of software 2" as illustrated in FIG. 10.

In a case of displaying a dependency relationship in a table, the influence-by-change analyzing unit 40 displays the table 31 of FIG. 8 as it is on the display unit 50. The table 31 of FIG. 8 is a table with axes respectively having a connection identifier given to identify communication content and software or each element of software. The influence-by-change analyzing unit 40 displays, on the display unit 50, a table in which the presence or absence of a dependency relationship or the degree of a dependency relationship is represented by a symbol or a numerical value.

Alternatively, as illustrated in FIG. 11, software or software elements selected by the user are arranged on both the vertical and horizontal axes, and the presence or absence or strength of a dependency relationship therebetween is displayed. In a table 31 of FIG. 11, the presence or absence or strength of a dependency relationship is displayed at a point of intersection of software elements on the vertical and horizontal axes. For example, the first row of the table 31 of FIG. 11 indicates the following relationship between a function F1 of software 1 and other software elements:

The dependency relationship between the function F1 of the software 1 and a function F2 of the software 1 is "none".

The dependency relationship between the function F1 of the software 1 and a function F3 of the software 1 is "none".

The dependency relationship between the function F1 of the software 1 and a function F4 of software 2 is "strong".

The dependency relationship between the function F1 of the software 1 and a function F5 of the software 2 is "none".

The dependency relationship between the function F1 of the software 1 and a function F6 of the software 2 is "none".

The dependency relationship between the function F1 of the software 1 and a function 1 of software 3 is "strong".

The dependency relationship between the function F1 of the software 1 and a function 2 of the software 3 is "none".

The dependency relationship between the function F1 of the software 1 and software 4 is "weak".

In addition, it can be seen that since the software 2 and the software 3 of the table 31 of FIG. 11 are all "x", there is no dependency relationship between the software 2 and the software 3.

In addition, when the analyzing unit 20 has performed analysis on a plurality of versions of the same software, change information indicating whether a change has been made to software elements and differential information are saved in the storage unit 30. The influence-by-change analyzing unit 40 refers to saved change information and differential information for software elements between arbitrary two versions, extracts, based on the change information and the differential information, software or a software element having a change or a difference, and displays a program element having been changed between the plurality of versions on the display unit 50. At that time, the influence-by-change analyzing unit 40 displays the fact that there is change information and differential information on the display unit 50.

The display unit 50 is a part that displays a dependency relationship according to content which the user have set by the input unit 10. The user traces the range of influence caused upon software change, by referring to content displayed on the display unit 50.

The user can arbitrarily select software or a software element displayed on the display unit 50. The influence-by-change analyzing unit 40 displays only the software or software element selected by the user, on the display unit 50. Alternatively, the influence-by-change analyzing unit 40 deletes the software or a software element selected by the user from the display unit 50 so that it is not displayed.

When the user selects software or a software element displayed on the display unit 50, the influence-by-change analyzing unit 40 displays only software or program elements having a dependency relationship with the selected software or program element. At that time, the influence-by-change analyzing unit 40 highlights the dependency relationship according to the strength of the dependency relationship.

For example, in FIG. 9, when the user selects software 3 displayed on the display unit 50, only software 1 and 4 having a dependency relationship with the selected software 3 are displayed.

By this, a dependency relationship between software scheduled to be changed or a software element scheduled to be changed which is selected by the user and other software or other software's program elements becomes clear. Thus, a dependency relationship visualization apparatus that easily checks a dependency relationship can be provided.

DESCRIPTION OF AN ADVANTAGEOUS EFFECT OF THE EMBODIMENT

As described above, an influence-by-change analysis apparatus according to the present embodiment can provide, in a system constructed by a plurality of pieces of software or devices, a dependency relationship between those pieces of software to a user, and thus is suitable for when examining/tracing influences caused by a change upon software change.

DESCRIPTION OF OTHER CONFIGURATIONS

Although a fixed value used to identify communication data is described using, as an example, a connection identifier defined by a communication protocol, the fixed value does not need to be one defined by a communication protocol, and any fixed value may be used as long as the fixed value is used to identify communication data. In addition, the fixed value does not need to be one used to identify communication data, and may be any invariant value used in a unified manner to identify data by all software, all hardware, or all firmware present in a system.

In addition, the fixed value is not limited to a numerical value and may be a symbol or a sign. In addition, the name of the fixed value may be any name which may be an identification ID, an identification tag, an ID, an attribute value, etc.

In addition, analysis-target software may be communication software that directly controls communication or may be data processing software that receives data from communication software. As long as data processing software is one that receives data with a connection identifier 22 and a data body 23 being a pair, the data processing software can be used as an analysis target.

In addition, it is also possible not to perform an operation of the relationship strength computation processing unit 240 by a user's instruction. In that case, upon displaying a dependency relationship on the display unit 50, "strong" or "weak" of the dependency relationship cannot be displayed.

In addition, a scheme for recording in the storage unit 30 may be any scheme as long as information required to perform processes by the influence-by-change analyzing unit 40 and the display unit 50 is included.

In addition, the influence-by-change analyzing unit 40 may display the diagram illustrated in FIG. 9 or 10 and the table illustrated in FIG. 8 or 11 on the same screen of the display unit 50.

In addition, the storage unit 30 may exist separately from the software analysis apparatus 100. When the storage unit 30 exists separately from the software analysis apparatus 100, a plurality of software analysis apparatuses 100 can share analysis results obtained by the analyzing unit 20.

In addition, the input unit 10 or the display unit 50 may exist separately from the software analysis apparatus 100. When the input unit 10 or the display unit 50 exists separately from the software analysis apparatus 100, a plurality of users can share the software analysis apparatus 100.

In addition, source code analyzed by the analyzing unit 20 may be stored in the storage unit 30 in advance, and the analyzing unit 20 may analyze the source code stored in the storage unit 30.

In addition, the analyzing unit 20 may not need to analyze change information and differential information for software elements of a different version of the same software, and may analyze only change information. Alternatively, only differential information may be analyzed.

In addition, the influence-by-change analyzing unit 40 may detect a dependency relationship by uniquely analyzing source code, instead of by referring to a dependency relationship between the connection identifier and program elements which is saved in the storage unit 30. This is performed for the purpose of, for example, a reduction in analysis time which is brought about by not analyzing a program element dependency relationship in an analysis stage of the analyzing unit 20, or a reduction in data to be saved in the storage unit 30.

In addition, the processes of the analyzing unit 20 and the influence-by-change analyzing unit 40 may be simultaneously performed by one program. Alternatively, some processes of the analyzing unit 20 may be performed by the influence-by-change analyzing unit 40, or some processes of the influence-by-change analyzing unit 40 may be performed by the analyzing unit 20.

REFERENCE SIGNS LIST

10: input unit, 11: apparatus, 12: apparatus, 13: communication channel, 14: connecting point, 20: analyzing unit, 21: destination data, 22: connection identifier, 23: data body, 24: check data, 30: storage unit, 31: table, 40: influence-by-change analyzing unit, 50: display unit, 60: input apparatus, 70: processor, 80: storage apparatus, 90: display apparatus, 100: software analysis apparatus, 201: comment analyzing unit, 202: specifying unit, 203: past referring unit, 204: presenting and selecting unit, 205: known-value using unit, 210: source code acquisition processing unit, 220: fixed value extraction processing unit, 230: program element extraction processing unit, 240: relationship strength computation processing unit, 250: storage processing unit.

The invention claimed is:

1. A software analysis apparatus for software that processes data and composing a system with other pieces of software, the software analysis apparatus comprising:
an analyzing unit executed by a processor of the software analysis apparatus to:
analyze source code of software that processes data, wherein a first set of software elements of the software is executed by a first computing device and a second set of software elements of the software is executed by a second computing device, wherein a plurality of software elements of the first set of software elements each has a different corresponding software element in the second set of software elements, wherein each of the plurality of software elements of the first set and its corresponding software elements of the second set is associated with a different respective entity of a plurality of entities,
extract, from communication data between the first computing device and the second computing device, a fixed value used to identify, from the plurality of entities, an entity associated with corresponding software elements, wherein the communication data has a format comprising a destination device identifier field, a field for the fixed value, and a data body, and
associate the fixed value with the corresponding software elements associated with the entity;
a storage apparatus to save, as analysis result information, association information between the fixed value and the corresponding software elements associated by the analyzing unit;
an influence-by-change analyzing unit executed by the processor to find a dependency relationship between a plurality of pieces of software based on the analysis result information saved in the storage apparatus; and
a display apparatus to display the dependency relationship found by the influence-by-change analyzing unit,
wherein the fixed value is a connection identifier that is given in order to identify communication content upon performing communication with other pieces of software and is common to the system composed of the plurality of pieces of software.

2. The software analysis apparatus according to claim 1, wherein
the processor executes a comment analyzing unit to extract the fixed value, and
the comment analyzing unit extracts the fixed value by using comment information described in the source code.

3. The software analysis apparatus according to claim 1, wherein the processor executes a specifying unit to extract the fixed value, and the specifying unit extracts the fixed value by using a description in the source code, the description being specified by a user.

4. The software analysis apparatus according to claim 1, wherein
the processor executes a past referring unit to extract the fixed value, and
the past referring unit extracts the fixed value by referring to an analysis result of software having a similar structure and having been analyzed in past.

5. The software analysis apparatus according to claim 1, wherein the processor executes a presenting and selecting unit to extract the fixed value, and the presenting and selecting unit extracts the fixed value by presenting a user with at least either one of reference statements and assignment statements in the source code and allowing the user to select the fixed value.

6. The software analysis apparatus according to claim 1, wherein
the processor executes a known-value using unit to extract the fixed value, and
the known-value using unit extracts the fixed value that is directly or indirectly assigned to a variable to which a known fixed value is assigned in the source code.

7. The software analysis apparatus according to claim 1, wherein the influence-by-change analyzing unit displays presence or absence or a degree of a software element dependency relationship on the display apparatus, having the fixed value and a software element on a vertical axis and a horizontal axis.

8. The software analysis apparatus according to claim 1, wherein the influence-by-change analyzing unit uses software elements as nodes and displays, on the display apparatus, a directed or undirected diagram in which the nodes are connected by whether there is a dependency relationship.

9. The software analysis apparatus according to claim 8, wherein the influence-by-change analyzing unit displays a strength of a dependency relationship between software elements by any of at least a thickness of a line, a length of the line, a type of the line, a color of the line, and a comment character, or by a combination of two or more of the thickness of the line, the length of the line, the type of the line, the color of the line, and the comment character.

10. The software analysis apparatus according to claim 1, wherein the influence-by-change analyzing unit displays, does not display, or highlights a software element selected by a user among software elements displayed on a display apparatus.

11. The software analysis apparatus according to claim 1, wherein
the analyzing unit analyzes change information or differential information for a software element of a different version of same software,
the storage apparatus saves the change information or the differential information, and
the influence-by-change analyzing unit displays a software element having the change information or the differential information on the display apparatus by referring to the change information or the differential information saved in the storage apparatus.

12. The software analysis apparatus according to claim 1, wherein the storage apparatus saves information on the source code or information on a related document related to the source code, and the influence-by-change analyzing unit displays the information on the source code or the information on the related document together with a software element on the display apparatus.

13. A software analysis method for software that uses a fixed value unified by a system composed of a plurality of pieces of software, the software analysis method comprising:
a source code acquiring step of acquiring source code of software, wherein a first set of software elements of the software is executed by a first computing device and a second set of software elements of the software is executed by a second computing device, wherein a plurality of software elements of the first set of software elements each has a different corresponding software element in the second set of software elements, wherein each of the plurality of software elements of the first set and its corresponding software elements of the second set is associated with a different respective entity of a plurality of entities;

a fixed value extracting step of extracting, from communication data between the first computing device and the second computing device, the fixed value used to identify, from the plurality of entities, an entity associated with corresponding software elements, wherein the communication data has a format comprising a destination device identifier field, a field for the fixed value, and a data body;

a program element associating step of associating the fixed value and the corresponding software elements associated with the entity;

a storing step of storing, as analysis result information, the association between the fixed value and the corresponding software elements in a storage apparatus; and an influence-by-change analyzing step of finding a dependency relationship between a plurality of pieces of software based on the analysis result information, wherein the fixed value is a connection identifier that is given in order to identify communication content upon performing communication with other pieces of software.

14. A non-transitory computer readable medium storing instructions that, when executed by a processing device, cause the processing device to implement a software analysis method for software that uses a fixed value unified by a system composed of a plurality of pieces of software, the software analysis method comprising:

a source code acquiring step of acquiring source code of software, wherein a first set of software elements of the software is executed by a first computing device and a second set of software elements of the software is executed by a second computing device, wherein a plurality of software elements of the first set of software elements each has a different corresponding software element in the second set of software elements, wherein each of the plurality of software elements of the first set and its corresponding software elements of the second set is associated with a different respective entity of a plurality of entities, a fixed value extracting step of extracting, from communication data between the first computing device and the second computing device, the fixed value used to identify, from the plurality of entities, an entity associated with corresponding software elements, wherein the communication data has a format comprising a destination device identifier field, a field for the fixed value, and a data body;

a program element associating step of associating the fixed value and the corresponding software elements associated with the entity;

a storing step of storing, as analysis result information, the association between the fixed value and the corresponding software elements in a storage apparatus; and an influence-by-change analyzing step of analyzing a dependency relationship between the plurality of pieces of software from analysis result information for source code of the plurality of pieces of software stored in the storage apparatus, wherein the fixed value is a connection identifier that is given in order to identify communication content upon performing communication with other pieces of software.

15. The software analysis apparatus according to claim 1, wherein different pieces of the software that processes data are distributed among a plurality of devices and configured to communicate using data messages via a device-to-device communication protocol in which each of the data messages includes one of a plurality of different fixed values with each fixed value corresponding to one of a plurality of function group types, wherein the analyzing unit is configured to extract, from the source code, one of the plurality of different fixed values used to identify data and a software element forming the software, and associate the extracted fixed value with the software element forming the software.

16. The software analysis apparatus according to claim 1, wherein the analyzing unit computes association information between the fixed value and one of the plurality of pieces of software having a dependency relationship by computing a relationship strength of the one of the plurality of pieces of software with the fixed value for each of the plurality of pieces of software.

17. The software analysis apparatus according to claim 1, wherein a particular software element of the first set of software elements or second set of software elements includes therein a connecting point for controlling the communication, the particular software element performs communication with other software elements through the connecting point of the particular software element, and the connecting point sets the fixed value or determines the corresponding software element by using the fixed value.

* * * * *